United States Patent [19]

Buckman et al.

[11] 4,164,674
[45] Aug. 14, 1979

[54] ELECTRIC MOTOR END PLAY CONTROL

[75] Inventors: John B. Buckman; Robert E. Lykes, both of Troy, Ohio

[73] Assignee: A. O. Smith Corporation, Milwaukee, Wis.

[21] Appl. No.: 815,098

[22] Filed: Jul. 13, 1977

[51] Int. Cl.² .............................................. H02K 5/16
[52] U.S. Cl. ...................................................... 310/90
[58] Field of Search ............................. 310/90, 260, 43

[56] References Cited

U.S. PATENT DOCUMENTS

| | | | |
|---|---|---|---|
| 2,483,013 | 9/1949 | Kopprasch | 310/90 |
| 2,947,893 | 8/1960 | Bussone | 310/90 |
| 3,037,822 | 6/1962 | Plummer | 310/90 UX |
| 3,359,628 | 12/1967 | Rutledge et al. | 310/90 X |
| 3,624,434 | 11/1971 | Pafler et al. | 310/90 |
| 3,726,575 | 4/1973 | Moorman | 310/90 X |
| 3,881,243 | 5/1975 | Bannon | 310/43 X |

Primary Examiner—Donovan F. Duggan
Attorney, Agent, or Firm—Andrus, Sceales, Starke & Sawall

[57] ABSTRACT

End play control construction to regulate the end play of a shaft of an electric motor between an end bearing and the rotor secured to said shaft, which comprises a bushing secured to the shaft adjacent the rotor and having an annular outwardly facing slot, a thrust collar slip fitted on the shaft and having an annular projection axially aligned with the slot in the bushing and disposed in final position in mashed engagement with the bushing by an ultrasonic horn under controlled conditions with an ultrasonic weld joining the bushing and thrust collar together to thereby space the assembled bushing and collar from the bearing of the order of 0.003 to 0.018 inches to establish a minimal amount of end play of the shaft. In a second embodiment of the invention the annular slot is in the thrust collar and is disposed in axial alignment with the annular projection in the bushing.

3 Claims, 7 Drawing Figures

ELECTRIC MOTOR END PLAY CONTROL

BACKGROUND OF THE INVENTION

Maintaining the proper axial internal clearance or end play of the rotor relative to the stator of an electric motor is very important for successful operation of sleeve bearing motors. Insufficient clearance causes excessive wear of thrust surfaces and may prevent low torque motors from starting. Excessive clearance also causes objectionable end bumping noise at motor start up and also can create alignment problems for external shaft mounted components such as gears, blowers and impeller. Approaches to the end play problem have been by the machining of the parts and the use of shims which add considerable cost to a motor. The present invention overcomes the problem by the use of a thrust collar and bushing ultrasonically welded together and located under controlled conditions with respect to the main frame and bearing on the shaft which provides the desired clearance of the bearing to permit easy motor starting and yet limited enough to lower end bumping noise to acceptable levels. By use of the invention more open toleranced parts can be used than is generally permitted with shims and machining of parts.

SUMMARY OF THE INVENTION

The invention in general is directed to a motor control assembly to control the end play between the rotor and stator in which a bushing and a thrust collar are strategically assembled around one end of the motor shaft so as to rotate with the shaft and are ultrasonically welded together to in effect form a single thrust member. In one embodiment the bushing has an outwardly facing annular slot which receives an annular projection on the thrust collar and the bushing and collar are welded or melted together to form the single thrust member. The thrust collar is assembled into place by a properly dimensioned ultrasonic horn fixture to locate the outer end of the thrust collar relative to the end of the main frame so that the thrust collar is displaced a distance of from 0.513 to 0.518 inches inboard from the face of the main frame. The sleeve bearing of the end frame assembly assembled on the end of the motor in turn extends inboard from the face of the main frame a distance of 0.500 to 0.510 inches and allows clearance of the bearing from the thrust collar to provide 0.003 to 0.018 inches end play of the rotor relative to the stator.

Under one embodiment of the invention the bushing is of a plastic material as is the thrust collar. Under another embodiment the thrust collar is of a plastic material but the bushing is of sintered metal.

BRIEF DESCRIPTION OF THE PREFERRED EMBODIMENTS OF THE INVENTION

Figure 1:
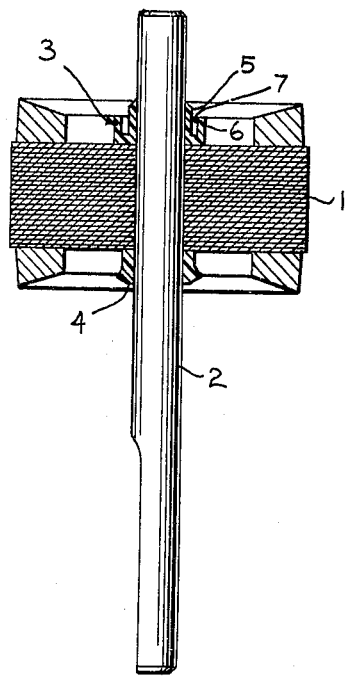
FIG. 1 is an elevational view with parts in section of a rotor assembled on the motor shaft and illustrating a thrust collar shrunk on the motor shaft into engagement with the rotor and a bushing which is press fitted onto the motor shaft in engagement with the rotor at the opposite side of the rotor.

Referring to FIG. 1 there is shown the assembly of the rotor 1 of an electric motor with the shaft 2. At the one end of shaft 2 as shown in FIG. 1 the bushing 3 is seated against rotor 1 and at the opposite shaft extension end of the shaft the usual thrust collar 4 seats against rotor 1. The bushing 3 in the first embodiment is made of a thermoplastic material such as a combination of nylon and molydenum sulphide, filled polyesters, polycarbonates and acetals which is press fitted onto shaft 2 to rotate with shaft 2. The material should be of a type which can be ultrasonically welded and provide a good thrust surface. Rotor 1 provides a backup for the plastic bushing 3.

As illustrating in FIGS. 1–5 of the drawing, the inner annular portion 5 of bushing 3 which engages shaft 2 extends outwardly a slightly greater distance than the outer annular portion 6 and portions 5 and 6 are separated by an annular slot 7 which opens outwardly of the face of the bushing. In addition the portion 5 is slightly tapered at the outer end as at 8.

Figure 2:
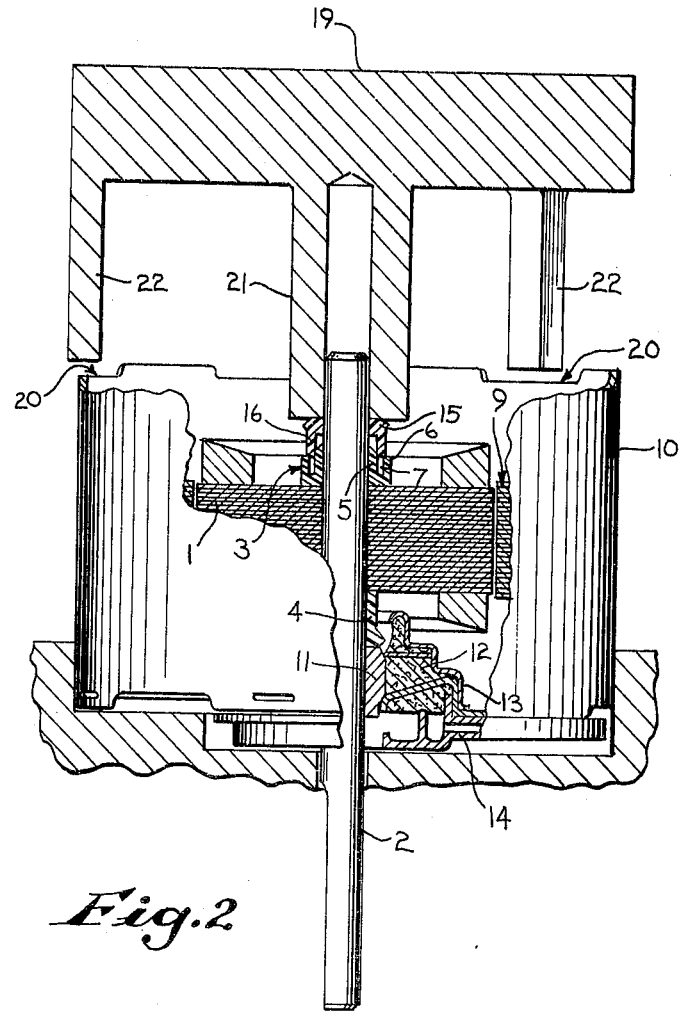
FIG. 2 is an elevational view with parts broken away in which the one end frame assembly has been attached to the main frame and the stator and the rotor assembly of FIG. 1 located inside the stator with the thrust collar of the invention shown to illustrate the starting assembly position with respect to mashing and welding together of the bushing and thrust collar.
Figure 3:
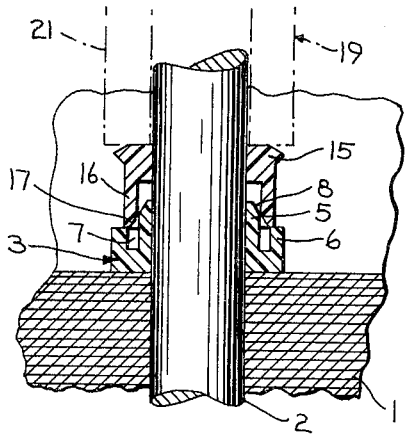
FIG. 3 is an enlarged sectional view with parts in elevation illustrating the initial assembly of the thrust collar with the bushing.

After assembly of the rotor 1, shaft 2, bushing 3 and thrust collar 4, the rotor shaft assembly is inserted inside of the bore of stator and coil assembly 9 located within main frame 10 with the extension end of shaft 2 protruding through the end frame assembly as illustrated in FIG. 2.

The shaft extension end portion of the motor includes the bearing 11 assembled on shaft 2 which rests against the thrust collar 4 in turn abutting the rotor 1. It also includes the wick 12 of absorbent material, means 13 to hold the wick 12 in place and the end frame 14.

After assembly of the described parts of the electric motor, the thrust collar 15 also of plastic material corresponding to that of bushing 3 is slip fitted onto the end of shaft 2 opposite the extension end. Thrust collar 15 has the inwardly extending annular projection 16 of a size generally complementary to annular slot 7 of bushing 3 but extends slightly outwardly of slot 7 to initially engage the outer annular portion 6 of bushing 3 and is tapered at the outer end as at 17 complementary to the tapered surface 8 of bushing 3 so that thrust collar 15 can be forced more readily into engagement with the outer end of bushing 3 as at 8.

Figure 4:
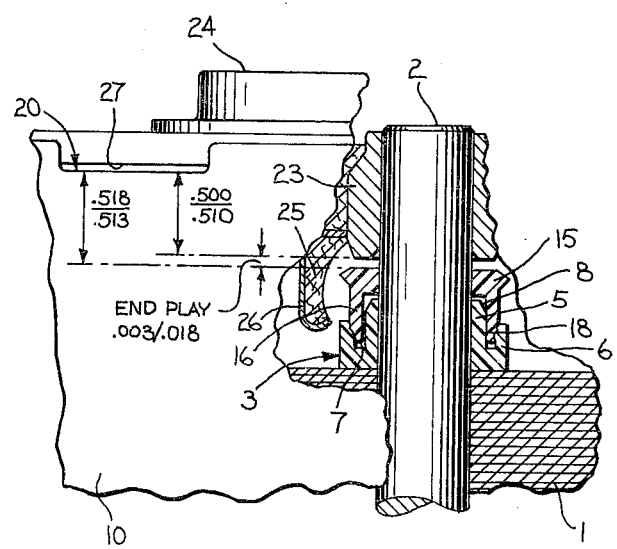
FIG. 4 is a view with the end frame assembled with the main frame after the ultrasonic weld has been completed and illustrating the end play distance between the bearing and assembled thrust collar and bushing.

Thrust collar 15 is joined to bushing 3 by an ultrasonic weld as at 18 as shown in FIG. 4 by the ultrasonic horn 19 in which the thrust collar 15 is displaced inwardly of the order of 0.513–0.518 of an inch from the face 20 of main frame 10 as shown in the FIG. 4 by horn 19 so that the thrust collar 15 and bushing 3 in effect become a single member. The ultrasonic horn 19 which is energized by a source of power, not shown, has the annular leg 21 which is positioned over shaft 2 and against the thrust collar 15 to be welded to bushing 3. Horn 19 when energized forms weld 18 by displacing thrust collar 15 by annular leg 21 with respect to bushing 3 until the outer leg 22 of horn 19 seats against the face 20 of the main frame 10 whereby a pressure or limit switch, not shown, deenergizes horn 19. The bearing 23 is then assembled into end frame 24 with wick 25 of an absorbent material and means 26 to hold wick 25 in such a manner that when bearing 23 is assembled on shaft 2 and surface 27 of end frame 24 is in its final position abutting surface 20 of main frame 10, the inboard face of bearing 23 extends inboard from the face 20 of the main frame 10 a distance of 0.500 to 0.510 inches and provides a clearance between bearing 23 and thrust collar 15 as shown in FIG. 4 of the order of 0.003 to 0.018 of an inch to control the end play of the rotor within those dimensions. This clearance is sufficient to permit easy motor starting and is tight enough to limit end bumping noise to acceptable levels.

Figure 5:
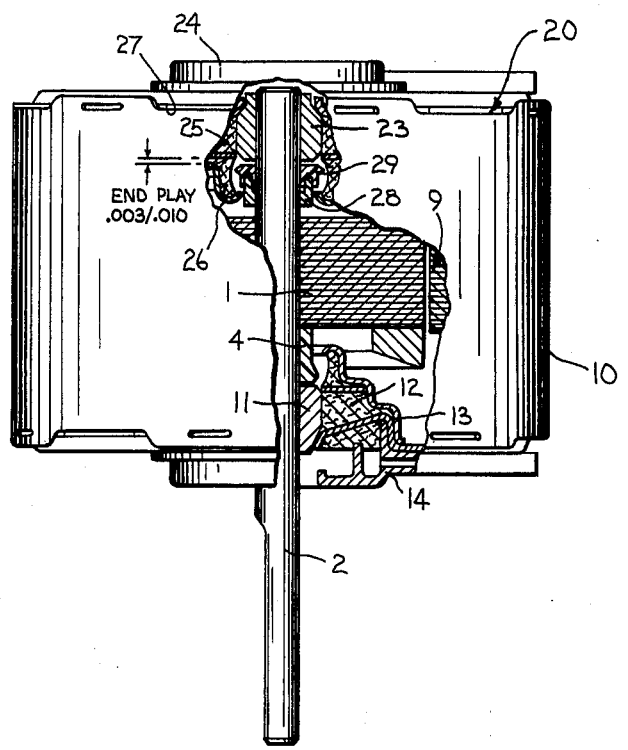
FIG. 5 is a view with parts in section and elevation of another embodiment of the invention illustrating the final assembly of a plastic thrust collar and a bushing of sintered metal.
Figure 6:
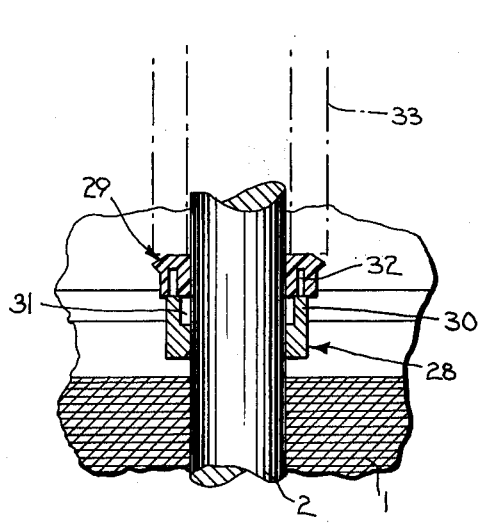
FIG. 6 is an enlarged view of the bushing and thrust collar of FIG. 5 with parts in section and elevation as initially assembled.
Figure 7:
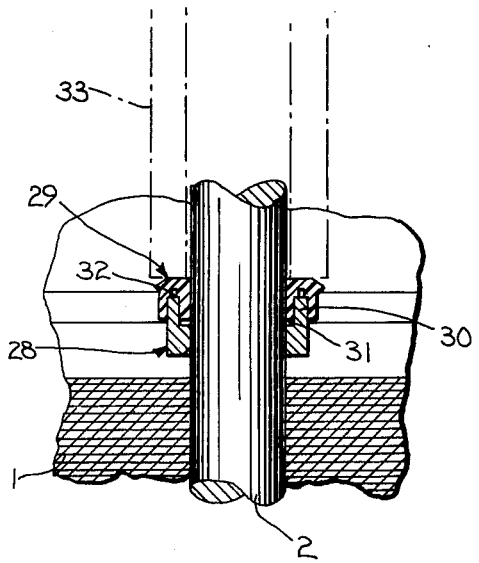
FIG. 7 is an enlarged sectional view with parts in elevation of the bushing and thrust collar of the second embodiment which are melted together after ultrasonic welding.

FIGS. 5-7 illustrate a second embodiment of the invention in which FIG. 5 shows the final assembly of a motor with parts broken away to illustrate the end play control of the rotor. In the second embodiment the bushing 28 is made of sintered metal such as iron which is shrunk onto shaft 2 and is spaced outwardly from rotor 1. The thrust collar 29, however, is made of a thermoplastic material as described with respect to the first embodiment.

In this embodiment bushing 28 has an annular outwardly extending projection 30 which is spaced from shaft 2 to form the annular slot 31 between shaft 2 and annular projection 30. Thrust collar 29 has an annular slot 32 formed generally complementary to annular projection 30 of bushing 28. An ultrasonic horn 33 corresponding to that of the horn 19 of the first embodiment is employed to force thrust collar 29 over projection 30 as the latter is received within annular slot 32 of collar 29. The bushing 28 and thrust collar 29 are thereby welded together by horn 33 and in effect form a single member. FIG. 6 illustrates the bushing 28 and thrust collar 29 as they appear before being ultrasonically welded together, and FIG. 7 illustrates the final welded position of bushing 28 and thrust collar 29.

Referring to FIG. 5 which illustrates the completed welding operation as in the first embodiment there is illustrated a clearance of the order of 0.003 to 0.018 of an inch between bearing 23 and thrust collar 29 after the final assembly with bushing 28. As noted with respect to the first embodiment, this clearance is sufficient to permit easy motor starting but not so great to result in end bumping noise above acceptable levels.

The assembly of the bushing and thrust collar of the invention is substantially the same in both embodiments. Thus, for purpose of illustration, referring to the first embodiment shown in FIGS. 1-4, the rotor 1 is initially secured to shaft 2 and the bushing 3 is then press fitted onto shaft 2 in abutting relation with rotor 1.

The main frame 10, stator and coil assembly 9 with end frame 14 and other parts which are attached to main frame 10 are placed in an assembly fixture, not shown. The assembly shown in FIG. 1 is then inserted through the bore of stator and coil assembly 9 with the shaft 2 protruding through bearing 11 and with thrust collar 4 engaging the face of bearing 11.

Thereafter thrust collar 15 is slip fitted over the upper end of shaft 2 and against bushing 3. The annular leg 21 of horn 19 is then slipped over shaft 2 and engages thrust collar 15. Horn 19 is then energized and forces collar 15 into bushing 3 to join collar 15 and bushing 3 by ultrasonic weld 18. The ultrasonic action stops when the outer leg 22 of horn 19 is fully seated on the face 20 of main frame 10. This positions the thrust collar 15 of the order of 0.513 to 0.518 of an inch inboard from face 20 of main frame 10.

The motor is completed by assembling bearing 23, wick 25 and holding means 26 into end frame 24 and attaching the end frame assembly in place with the bearing 23 located over shaft 2 and the surface 27 of end frame 24 in its final position with respect to abutting surface 20 of main frame 10 as illustrated in FIG. 4, and the inboard face of bearing 23 is then disposed inboard of face 20 of main frame 10 a distance of 0.500 to 0.510 inches and provides a clearance between bearing 23 and thrust collar 15 of the order of 0.003 to 0.018 of an inch. The clearance between bearing 23 and thrust collar 15 thus limits the end play of rotor 1 within 0.003 to 0.018 of an inch.

The invention eliminates the use of machining and shims and cushion washers to control end play and deaden undesirable bumping noise. The use of the ultrasonic horn to engage the end frame and weld the thrust collar to the bushing makes it possible to consistently locate the collar in engagement with the bushing to provide a controlled clearance within close tolerance limits between the sleeve bearing and the thrust collar and bushing.

Various modes of carrying out the invention are contemplated as being within the scope of the following claims particularly pointing out and distinctly claiming the subject matter which is regarded as the invention.

We claim:

1. In an end play control construction regulating the end play of the shaft of an electric motor having a rotating member secured to the shaft and lodged within the main frame of the motor, a bushing secured to the shaft adjacent the rotating member, a thrust collar secured to the bushing within the order of 0.513 to 0.518 of an inch from the face of the main frame, a bearing assembled over one end of the shaft within the order of 0.500 to 0.510 of an inch from the face of the main frame and thereby providing a clearance between the thrust collar and bearing of the order of 0.003 to 0.018 of an inch to establish a minimum amount of end play of the shaft.

2. The end play control construction of claim 1 in which the thrust collar has an inwardly extending annular projection and the bushing has an annular slot disposed complementary to the projection on the thrust collar to receive the projection on the thrust collar when the bushing and thrust collar are secured together.

3. The end play control construction of claim 1 in which the thrust collar has an inwardly opening annular slot and the bushing has an annular projection aligned with the slot in the bushing and lodged in the slot when the bushing and thrust collar are secured together.

* * * * *